United States Patent [19]

Conley

[11] Patent Number: 4,921,066
[45] Date of Patent: * May 1, 1990

[54] DUAL CONTROL DRIVING SYSTEM

[75] Inventor: Challie Conley, Villa Park, Calif.

[73] Assignee: Refuse Trucks, Inc., Chino, Calif.

[ * ] Notice: The portion of the term of this patent subsequent to Feb. 23, 2005 has been disclaimed.

[21] Appl. No.: 158,350

[22] Filed: Feb. 22, 1988

Related U.S. Application Data

[63] Continuation-in-part of Ser. No. 866,862, May 23, 1986, Pat. No. 4,726,441.

[51] Int. Cl.$^5$ ............................................... B62D 1/22
[52] U.S. Cl. ................................... 180/322; 180/325; 74/494
[58] Field of Search ....................... 180/321, 322, 325; 74/494

[56] References Cited

U.S. PATENT DOCUMENTS

| | | | |
|---|---|---|---|
| 2,406,261 | 8/1946 | Sprinkel | 180/322 |
| 2,791,915 | 5/1957 | Merry | 180/322 |
| 3,814,204 | 6/1974 | Larkin | 180/322 |
| 4,726,441 | 2/1988 | Conley | 180/322 |

*Primary Examiner*—Kenneth R. Rice
*Attorney, Agent, or Firm*—Price, Gess & Ubell

[57] ABSTRACT

An improved dual control driving system is provided for a combustion engine powered vehicle moveable on wheels and having a pair of steering systems, a pair of braking systems and a pair of accelerator systems. The steering systems work in tandem with each other; the braking systems work in tandem with each other. The accelerator systems, however, work independently of each other.

12 Claims, 5 Drawing Sheets

DUAL CONTROL DRIVING SYSTEM

CROSS REFERENCE TO RELATED APPLICATION

This application is a continuation-in-part of an earlier application, Ser. No. 866,862, filed May 23, 1986, now U.S. Pat. No. 4,726,441.

BACKGROUND OF THE INVENTION

1. Field of the Invention

The present invention relates generally to the field of dual control driving systems and, more specifically, to an improved dual control driving system in a combustion engine powered vehicle.

2. Brief Description of the Prior Art

In the past, artisans have designed dual control steering systems to enable an operator to steer the vehicle from either the driver's side or the passenger's side. These designs have found use in vehicles such as refuse collection trucks and driver's training cars. A common design utilizes a chain and gear system to transfer movement from one steering wheel to the other. However, problems exist with such a design. The system tends to be bulky and heavy. As with any chain and gear system, the chain is susceptible of becoming disengaged from the gears by unusual or erratic movement.

In conjunction with a dual steering system, artisans have provided dual braking systems to enable the operator to brake the vehicle from either the driver's side or the passenger's side. Past designs have included the use of cables to operatively join the two braking systems to each other. Problems also exist with this aspect of such dual control systems, such as the stretching and twisting of the cable, and the numerous parts required.

Dual accelerator systems have also been provided but are typically incapable of controlling the power output of the engine independent of each other.

As can be appreciated, there is still a need in the art to provide a less bulky and more reliable dual control driving system.

SUMMARY OF THE INVENTION

One object of the present invention is to provide an improved dual control driving system for a combustion engine powered vehicle.

Another object of the present invention is to provide a dual control driving system having a dual steering system, a dual braking system, and a dual accelerator system.

A further object of the present invention is to provide a dual control steering system wherein one system is operatively engaged to at least one wheel of the vehicle through the other steering system.

An even further object of the present invention is to provide a dual braking system wherein one braking system is operatively engaged to at least one wheel of the vehicle through the other braking system.

A still further object of the present invention is to provide a dual accelerator system whereby each system works independently of the other.

Yet another object of the present invention is to provide a manner of easily modifying a standard vehicle for dual control while minimizing the space utilized in a cab area for such modification.

The objects of the present invention are particularly accomplished by providing a first steering system having a first post element engaged to at least one wheel, a sleeve element fixed to the first post element, a first adaptor element engaged to the sleeve element, and a first steering element held by first adaptor element. A second steering system is provided and includes a second steering element, a second adaptor element that holds the steering element, and a post element that supports the second adaptor element. A steering shaft element and a pair of gear breaks the first and second steering systems for tandem operation. A first braking system is provided in addition to a second braking system engaged to the wheels through the first braking system. A pair of bearing elements, a brake shaft element journalled in the bearing elements, a first brake lever fixed to the brake shaft element, a second brake lever also fixed to the brake shaft element, and a linkage element connected to the first brake lever the first and second braking systems. A pair of accelerator control systems are also provided for operation independent of each other.

In another embodiment of the present invention, a first steering is provided as above, but the second steering utilizes a support assembly, instead of a post element, that supports the steering element and is positioned within a dashboard area. In addition, the dual braking systems are provided with a brake shaft element and bearing elements in a cab area rather than in an engine compartment as in the above embodiment.

These and other objects of the present invention will be evident from an examination of the following drawings, specification, and claims hereto.

DETAILED DESCRIPTION OF THE PREFERRED EMBODIMENT

The following description is provided to enable a person skilled in the mechanical and motor powered vehicle arts to make and use the present invention, and sets for the best modes contemplated by the inventor for carrying out his invention. Various modifications, however, will remain readily apparent to those skilled in the arts, since the generic principles of the present invention have been defined herein specifically to provide an improved dual control driving system.

Figure 1:
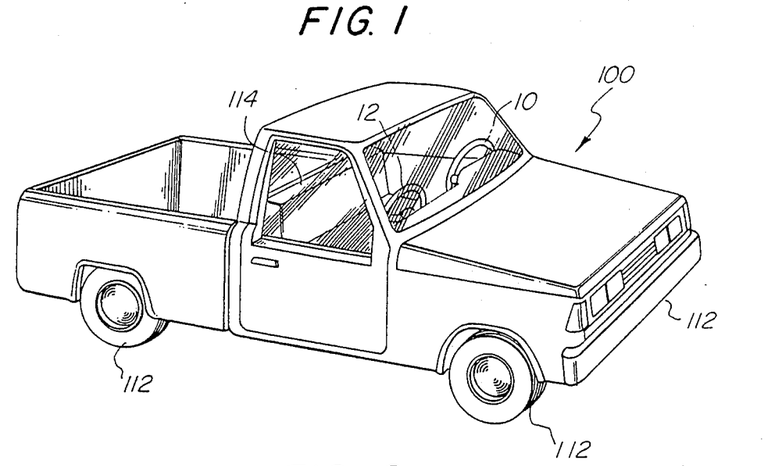
FIG. 1 shows a perspective view of a vehicle having a dual control driving system.

In FIG. 1, a conventionally designed vehicle 100 is provided with modifications. The present invention modifies the standard vehicle 100 by providing a dual control driving system for the vehicle 100 in three respects: (i) a dual steering control system, (ii) a dual braking system, and (iii) a dual accelerator control system. The three pairs of systems are designed to enable an operator to operate the vehicle 100 while sitting on a seat 106 in the operating or cab area 114 of the vehicle 100. If on the driver's side or position in the cab 114 (the left side when viewed from the rear of the vehicle 100 towards the front), the user operates the vehicle 100 by a first control system having a first steering system, a first braking system, and a first accelerator system. If on the passenger's side or position (right side when viewed from the rear of the vehicle 100), the user operates the vehicle 100 by a second control system having a second steering system, a second braking system, and a second accelerator system.

Figure 2:
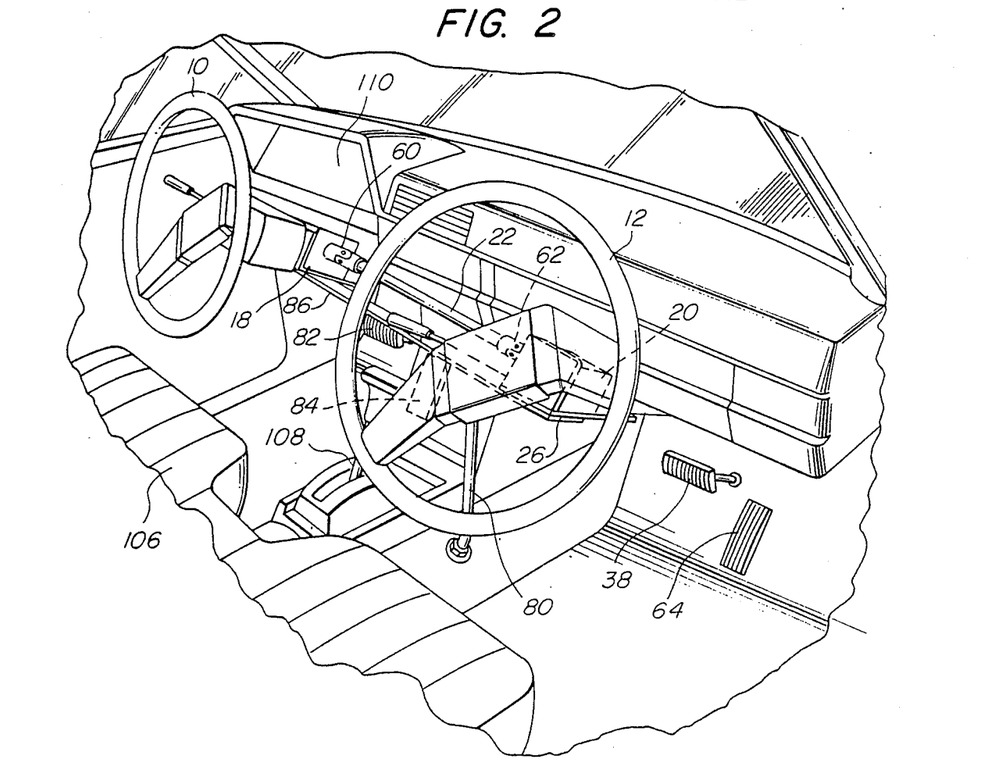
FIG. 2 is an enlarged perspective view of the cab area of the vehicle according to a first embodiment of the present invention.
Figure 5:
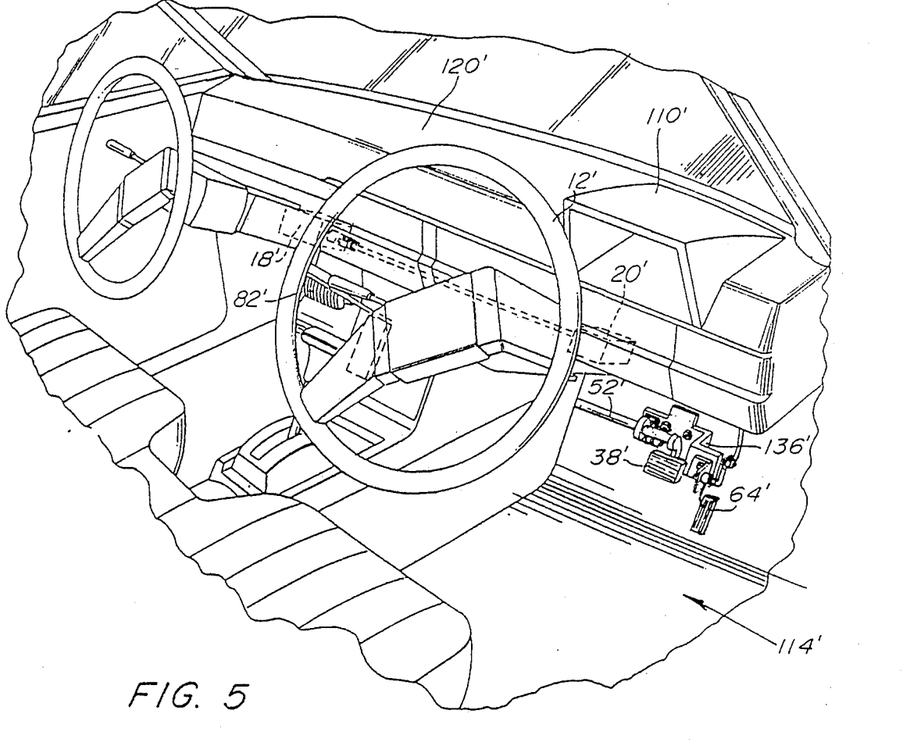
FIG. 5 is a perspective view of a cab area of a vehicle according to a second embodiment of the present invention.

As better shown in FIG. 2, whether the user is seated on either the driver's side or the passenger's side in the cab 114, and uses the first control system or the second control system, respectively, a conventionally designed control display 110 always remains in view of the user. As shown in FIG. 5, the control display 110' may be moved onto the passenger side of the cab 114' when the vehicle is intended to be almost exclusively operated from such side. The control display 110 typically shows the speed of the vehicle 100, the amount of fuel remaining in the vehicle 100, and other commonly found indicators. Also, a gear shift element 108 is preferably provided on the floor of the cab area 114 to enable the user to select the gears of the transmission in the vehicle 100 while on either side of the cab 114.

Figure 3:
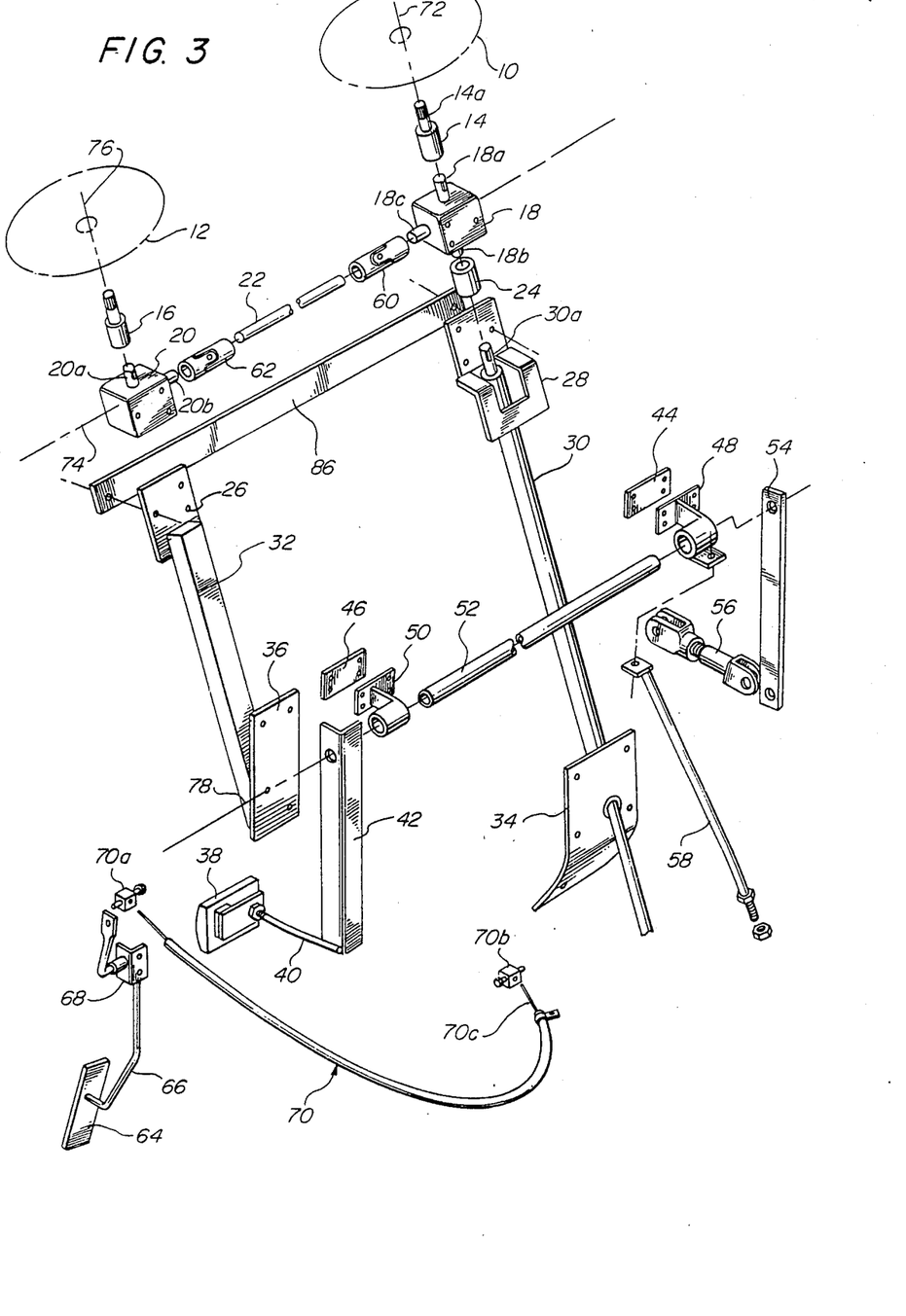
FIG. 3 is an enlarged, elevational perspective view of the component parts making up the dual control system according to a first embodiment of the present invention.

In a first embodiment of the present invention, the first steering system for the driver's side, as in FIG. 3, utilizes a conventionally designed steering column. A first post element 30 is part of the conventional steering column and is a generally elongated rod shaped element that extends from within the cab 114 and through an engine compartment 116 (FIG. 4) of the vehicle 100 to operatively engage conventionally designed mechanisms for turning the two wheels 112 at the front end of the vehicle 100. The end of the post element 30 opposite such engagement for turning includes a member 30a having an outside diameter less than the outside diameter of remainder of the post element 30. The member 30a includes a raised portion thereon that extends alongs its longitudinal axis. The first post element 30 is positioned at an angle above the floor of the cab area 114 (generally described by a first axis 72) and supported thereat by a support plate 34 stationarily fixed in the forward floor portion of the cab area 114. The support plate 34 is a generally flat, rectangular shaped metallic element fashioned in an obtuse angle with an aperture therein and through which the first post element 30 passes. The aperture of the support plate 34 is conventionally designed, such as with bearings, to enable the first post element 30 to rotate therein about the first axis 72.

The first post element 30 is further supported within the cab area 114 by a support plate 28 which is preferably a flat, metallic element generallY in a "Z" configuration with right angles. The support plate 28 includes a rectangular shaped aperture therein and through which the first post element 30 passes and rotates about the first axis 72. The support plate 28 is stationarilY fixed to the lower or underside of the control display 110 in any appropriate conventional manner, such as with bolts.

A sleeve element 24 engages the member 30a, and also engages a first gear box 18 described below, and is thereby positioned along the first axis 72. The sleeve element 24 is a tube shaped element with an outside diameter approximately the same as that of the member 30a and having a slot therein that engages the raised portion on the member 30a.

The first gear box 18 provides three-way movement and is preferably of a 1:1 ratio spiral cut gear, such as the Browning gear No. LR3HSB1LR10. The first gear box 18 includes three gear shaft members 18a, 18b, 18c, each of which preferably includes a raised portion like that of member 30a. Shaft members 18a, 18b lie along the first axis 72. Member 18c lies along a second axis 74 which is generally perpendicular to the first axis 72. The raised portion of the gear shaft member 18b engages the slot in the sleeve element 24, thereby radially fixing the member 18b to the post element 30. Member 18c stationarily holds a first adaptor element 14 that engages a first steering wheel 10 to radially fix the steering wheel 10 to the member 18a.

The adaptor element 14 is a generally cylindrical shaped element having a bore therein with a longitudinal extending slot that engages the raised portion of the gear shaft member 18a. On the end of the adaptor element 14 opposite the end that engages the shaft member 18a is a post member 14a having a cylindrical shaped configuration whose diameter is less than the outside diameter of the portion of the adaptor element 14 that engages the shaft member 18a. That post member 14a is stationarily fixed to the first steering wheel 10 in any conventional manner.

In the first preferred embodiment, the second steering system comprises a design similar to the first steering system. In FIG. 3, the second steering system includes a second post element 32 stationarily fixed within the cab area 114 at an angular position to the floor of the cab 114 (generally described by a third axis 76 which is perpendicular to the second axis 74), like that of the first post element 30. The second post element 32 is stationarily fixed in a nonrotating manner within the cab 114 by a support plate 36, a support plate 26, and a support post 80. The second post element 32 is an elongated, rectangular shaped metallic element which, unlike the first post element 30, extends only within the cab area 114.

The support plate 36 is a flat, rectangular shaped metallic element preferably fixed stationarily at the forward floor portion of the cab area 114. One end of the second post element 32 is stationarily fixed to the support plate 36 by conventional means such as bolts. The other end of the second post element 32 is stationarily fixed to the support plate 26 which is also a flat, rectangular shaped metallic element that lies generally along the third axis 76. The plate 26 extends from a point near the end of the second post element 32 and towards the rear portion of the cab 114 to serve as a base for a gear box 20. The support post 80 is an angulated, rod-shaped element that is stationarily fixed at one end to the support plate 26. The other end is stationarily fixed to the floor portion of the cab 114 to provide further support to the post element 32. A tie bar 86 is also provided and rigidly extending from the support plate 26 to the support plate 28. The tie bar 86 is preferably at flat rectangular shaped metallic element that provides stability between the two steering systems and prevents gear slippage of the first gear box 18 and a second gear box 20 mentioned below.

A second gear box 20 is stationarily fixed to and supported by the support plate 26. The gear box 20 provides two-way movement and is preferably of a 1:1 ratio spiral cut gear, such as the Browning gear No.

SN3HSB1SN10. It includes a gear shaft member 20b that lies along the second axis 74 and a gear shaft member 20a that lies along the third axis 76. The shaft member 20a engages a second adaptor element 16 similarly designed and configured like that of the first adaptor element 14. Also like the first adaptor element 14, the second adaptor element 16 engages a second steering wheel 12 to radially fix the steering wheel 12 to the member 20a.

The member 20b engages a universal joint element 62 of conventional design. Likewise, the shaft member 18c of the first gear box 18 engages a similarly designed universal joint element 60. The universal joint elements 60, 62 fix between them a steering shaft element 22 which is a rigid, elongated cylindrical element. The joint elements 60, 62 thereby maintain the shaft element 22 along the second axis 74 and transfer rotation from the gear boxes 18, 20 to the shaft 22, notwithstanding divations of alignment between the shaft members 18c and 20b along the axis 74.

A first braking system (not fully shown) is provided for use while the user operates the first steering system. The first braking system is of any conventional design found in an unmodified vehicle which can be activated by a first brake activation element 82 as shown in FIG. 2. When the user depresses the first brake activation element 82 with his foot, conventional braking mechanisms retard the rotation of one or more wheels 112.

A first accelerator system (not fully shown) is also provided for use while the user operates the first steering system and first accelerator system. Again, the first accelerator system is of any conventional design found in an unmodified vehicle from the factory. A first accelerator activation element 84, as shown in FIG. 2, is provided to enable the user to activate the first accelerator system and thereby control a conventional carburetor (not shown) to a motor 102 in the vehicle 100.

A second braking system is provided for use in connection with the second steering system. The second braking system retards the rotation of the those wheels 112 that are retarded by the first braking system. As depicted in FIGS. 2 and 3, according to the first preferred embodiment, a second brake activation element 38 is provided in the cab 114 and configured like that of the first brake activation element 82. A connector element 40 is an elongated, arc-shaped element that stationarily fixes the second activation element 38 to a second brake lever 42 outside of the cab 114. The second brake lever 42 is a flat, rectangular shaped metallic element having a right angle therein. One end thereof is fixed to the connector element 40. The other end defines an aperture positioned along a fourth axis 78 which is generally parallel to the second axis 74 (FIG. 3). The second brake lever 42 is disposed within the engine compartment 116 and rotatably holds a brake shaft element 52 through a bearing element 50.

Figure 4:
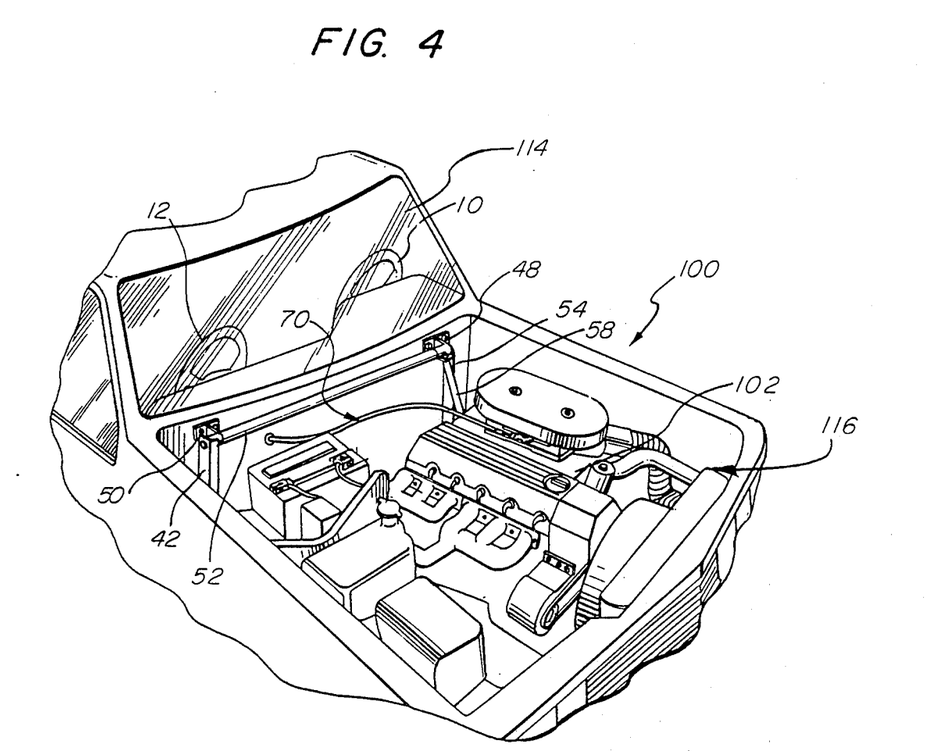
FIG. 4 is an enlarged perspective view of the engine compartment of the vehicle according to a first embodiment of the present invention.

The brake shaft element 52 is an elongated, rod shaped element having one end thereof journalled in the bearing element 50, the latter being of any conventional design. The bearing element 50 is stationarily fixed to the wall of the engine compartment 116, as shown in FIG. 4, with the aid of a bearing plate 46 disposed on the opposite side of such wall. The bearing plate 46 is a flat, rectangular shaped metallic element that can be bolted to a similarly configured portion of the bearing element 50.

At the end of the brake shaft element 52 opposite the bearing element 50 is a similarly designed bearing element 48 fixed to the wall of the engine compartment 116 with the aid of a bearing plate 44, like that of the bearing plate 46. The end of the brake shaft element 52 that is journalled in the bearing element 48 is stationarily fixed in an aperture of a first brake lever 54, the aperture being positioned on the fourth axis 78.

The first brake lever 54 is a flat, rectangular shaped metallic element disposed within the engine compartment 116, as shown in FIG. 4. The end of the first brake lever 54 which is opposite the aperture on the fourth axis 78 is rotatably fixed to a linkage element 56 that operatively engages the first braking system in any conventional fashion. The bearing element 48 is further supported by a brace element 58 which is an elongated, rod shaped element, one end of which is stationarily fixed to the bearing element 48 and the other end of which cans fixed to a stationary part in the engine compartment 116.

A second accelerator system is provided for use in conjunction with the second steering system and second braking system. In contrast to the pair of steering systems and pair of braking systems, the second accelerator system operates independently of the first accelerator system. As shown in FIGS. 2 and 3, according to the first preferred embodiment, a second accelerator activation element 64 is provided in the cab 114 and configured like that of the first accelerator activation element 84. An arm element 66 is rotatably held in an arm support element 68 which is preferably fixed stationarily to the forward floor portion of the cab area 114. As depicted in FIG. 3, the arm element 66 is an elongated, rod shaped element with one end connected to the second activation element 64, while the other end is engaged to a second accelerator cable assembly 70.

The cable assembly 70 contains a screw element 70a to hold one end of a cable 70c to the arm element 66. Another screw element 70b is at the opposite end of the cable 70c and fixes the cable to the carburetor on the motor 102. The connection of the cable system 70 is independent of the connection of the first accelerator system to the carburetor.

In operation, the user has the option of controlling the vehicle 100 from either the driver's side or the passenger's side. If the user chooses to be on the driver's side, the motor 102 is started by a conventional ignition system. Movement of the car is initiated by appropriate manipulation of the gear shift element 108 to engage the gears of the transmission. The rate of movement of the vehicle 100 is commenced by the user's foot depressing the first accelerator activation element 84 to engage the first accelerator system. If the user desires to retard the movement of the vehicle 100, the user's foot depresses the first brake activation element 82 to engage the first braking system. The direction of movement of the vehicle 100 is controlled by the first steering system.

As in a conventionally designed vehicle, the user rotates the first steering wheel 10 in either a clockwise or counterclockwise direction. Such rotation causes the first adapter element 14 to rotate and thereby rotate the gear shaft member 18a in the same direction. Rotation of the gear shaft member 18a causes the gear shaft member 18b to rotate in the same direction and thereby the sleeve element 24 and the first post element 30. Rotation of the gear shaft member 18a also causes the gear shaft member 18c to rotate in an opposite direction when viewed from the second gear box 20. Rotation of the gear shaft member 18c is transferred through the universal joint element 60, the shaft element 22, and the universal joint element 62.

The universal joint element 62 thereby, transfers the rotational movement of gear shaft member 18c to gear shaft member 20b of the second gear box 20. The gear shaft member 20a is thus rotated along with the second adaptor element 16 to rotate the second steering wheel 12 in the same direction as that of the first steering wheel 10.

In the event that the user desires to steer the vehicle 100 from the passenger's side, the second steering system is utilized. The rotational movement of the second steering wheel 12 is transferred through the second gear box 20 and then to the first gear box 18, similar to that described above when operating the first steering system. As rotational movement is imparted into the first gear box 18 from the second steering system, the gear shaft member 18b rotates, as well as the sleeve element 24 and first post element 30. Consequently, the same wheels 112 are turned as when the user manipulates the first steering wheel 10.

To activate the second braking system, the user's foot depresses the second brake activation element 38 to rotate the second brake lever 42 about the fourth axis 78. Such rotation causes the brake shaft element 52 to similarly rotate within the bearing elements 48, 50. The first brake lever 54 is thereby rotated about the fourth axis 78 and activates the first braking system through the linkage element 56.

Acceleration of the vehicle 100 is controlled from the passenger's side through the second accelerator system. Depression of the second accelerator activation element 60 by the user's foot rotates the arm element 66 within the arm support element 68 to activate the second accelerator cable assembly 70. The carburetor is thereby opened and closed as the user depresses or releases the second accelerator element 64.

In a second preferred embodiment of the present invention, dual controls are again provided but with structural support systems that are even less bulky than those in the first preferred embodiment. As partially shown in FIG. 5 by the phantom lines, the supporting system for the two steering systems are inside a standard dashboard 120'. Consequently, the area in the cab 114' is not significantly diminished in size from the two systems.

Figure 6:
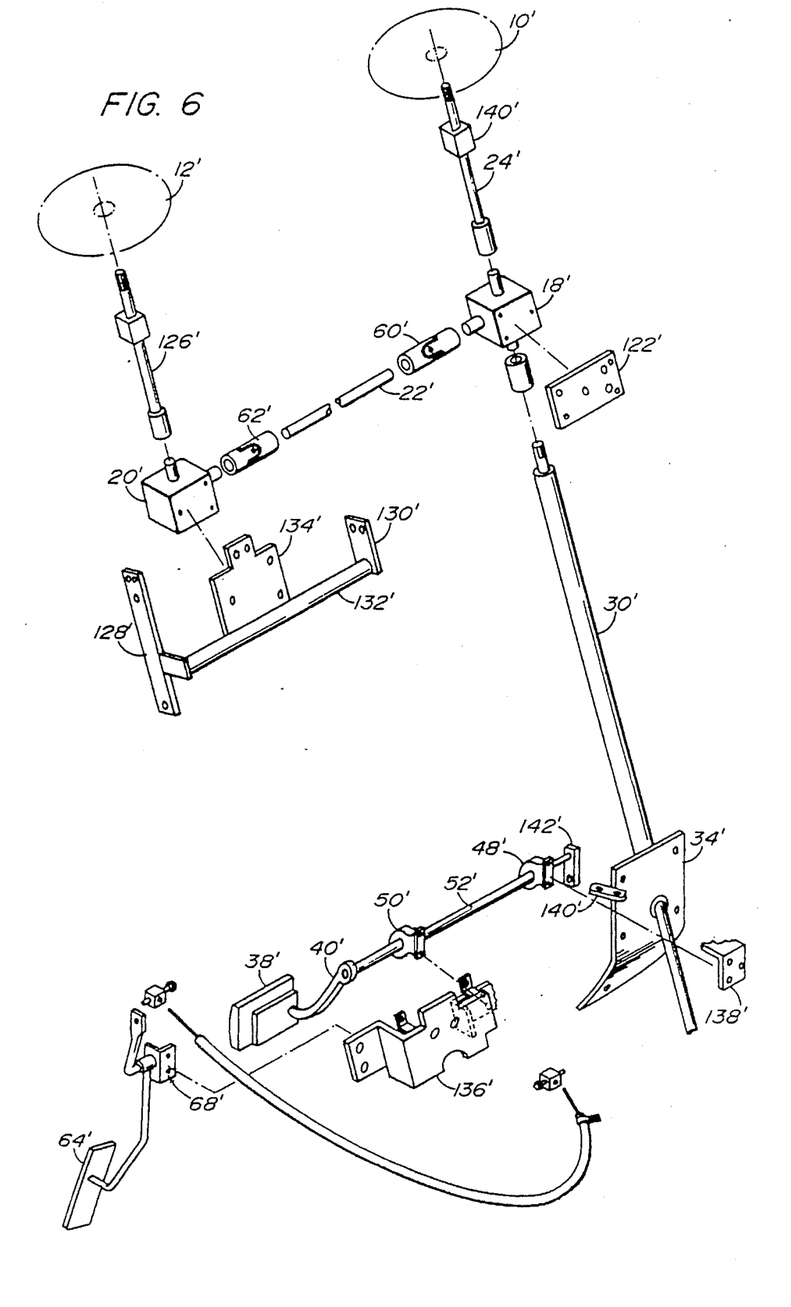
FIG. 6 is an elevational perspective view of the component parts according to the second embodiment of the present invention.

In the first steering system, a first post element 30' and a support plate 34' are provided as in the first preferred embodiment. Unlike the first preferred embodiment, the second preferred embodiment does away with the use of the support plate 28 and instead uses a flat rectangular shaped support plate 122' that may be securely affixed within the dashboard 120' to an existing factory installed support structure for a steering column. The support plate 122' serves to support a three way gear box 18' which is constructed like the gear box 18 in the first preferred embodiment. The gear box 18' transfers rotational movement between the post element 30' and a sleeve element 24', which is configured like the sleeve element 24, but longer in length. Also like in the first preferred embodiment, a steering element 10' directs rotational movement to the gear box 18'. It does so through the use of the adaptor element 24' which essentially serves the same purpose as the adaptor element 14. However, in the second preferred embodiment, the adaptor element 24' allows the gear box 18' and the support plate 122' to be positioned inside the dashboard 120'. Further, conventional mechanisms 140' for turn signal indicators and windshield wipper activators can be located about the adaptor element 124'.

Also like in the first preferred embodiment, the second preferred embodiment utilizes a second steering element 12' and a two way gear box 20' to transfer rotational movement from the second steering system through the first steering system and then to the wheels. Also, as in the first steering system, the two way gear box 20' is positioned within the dashboard 120' by the use of an adaptor element 126' which is configured and dimensioned like the adaptor element 124'. The support structure for the second steering system is also located within the dashboard 120'. That system includes a side bracket 128' that is a flat rectangular shaped rigid element that can be affixed to existing structure within the factory dashboard 120'. Another side bracket 130' is also provided for attachment to existing structure and is configured like the side bracket 128', both of which support therebetween a rod element 132' which is a rigid and preferably metallic element. A plate 134' is rigidly affixed to the rod element 132', such as by welding, and is also affixed within the dashboard 120'. The plate 134' serves to support the two way gear box 20' within the dashboard 120'. As can be seen, in the second preferred embodiment, the need of additional support structure such as the tie bar 86, the post element 32, and the support plate 36 is eliminated. The two steering systems transmit motion between one another through the system of universal joint elements 60', 62', and a shaft element 22' therebetween, as in the first preferred embodiment.

As to the dual braking systems in the second preferred embodiment, the connecting and support structure is moved out of the engine compartment area, as in the first embodiment and into the cab 114' in the event that the engine compartment does not have sufficient space for necessary modifications. The first braking system utilizes the factory provided system. The second braking system on the passenger side utilizes a brake activation element 38' in the cab 114'. A connector element 40' is an arc-shaped element that stationarily fixes the second activation element 38' to a shaft element 52' which is also within the cab 114' near the floor board. The brake shaft element 52' is supported near its two opposite ends by bearing elements 48', 50', both of which are located in the cab 114'. A somewhat U-shaped support 136' is fastened at the floor board within the cab 114' to support the bearing element 50'. The support 136' also supports a part of the second accelerator system described below. A support 138' is also fixed at the floor board in the cab 114' to support the bearing element 48'. Linkage elements 140', 142' are fixed at an end of the brake shaft element 52' adjacent the bearing element 48' to link the shaft 52' to a first brake activation element 82'.

In the second preferred embodiment, the first and second accelerator systems are provided as in the first preferred embodiment. In the second preferred embodiment, the second accelerator system uses an acceleration activation element 64' that is affixed to a support element 68' which is in turn supported by the support 136'.

In the event that the modified vehicle with dual steering, braking, and accelerator systems is intended to be used from almost exclusively at the passenger side, for example, the control display 110' may be moved onto the passenger side of the dashboard 120'. The first steering element 10' may be removed and the three way gear box 18' is simply replaced with a two way gear box 20'.

It should be understood, of course, that the foregoing relates to only two preferred embodiments of the invention and that modifications may be made without departing from the spirit and scope of the invention as set forth in the following claims, wherein:

I claim:

1. An improved dual control driving system for a vehicle movable on wheels, comprising:
    a first steering system for altering the vehicle's direction of movement, the first steering system having a first rotating post element operatively engaged to at least one wheel and extending from a floor of said vehicle to a extending from a floor of said vehicle to a dashboard, the first post element being fixed in a cab area of the vehicle to prevent tilting movement of the first post element;
    a second steering system dependent upon the first steering system for altering the vehicle's direction of movement the second steering system being constructed so as to obviate the need for another post element similar in function and configuration to the first post element;
    first means for connecting the first and second steering systems for tandem operation, the first means being off of a floor area of the cab;
    means for stationarily fixing the positions of the first steering system and the second steering system in the cab area, including a plurality of support plates;
    a first braking system operatively engaged to at least one wheel;
    a second braking system dependent upon the first braking system for retarding the vehicle's movement, the second system being operatively engaged through the first braking system to those wheel engaged by the first braking system;
    second means for connecting the first and second braking systems for tandem operation;
    a first accelerator control system for controlling the speed of the vehicle; and
    a second acceleration control for controlling the speed of the vehicle independent of the first accelerator control system.

2. The driving system according to claim 1 wherein said first means is located in an open area of said cab.

3. The driving system according to claim 1 wherein said first means is located within a dashboard in said cab.

4. The driving system according to claim 1 wherein said second means is located outside the cab.

5. The driving system according to claim 1 wherein said second means is located inside said cab.

6. An improved dual control driving system in a vehicle movable on wheels and operable by an operator within a cab area of the vehicle, the cab having a driver's position, a passenger's position and a floor, the driving system being operable from either the driver's or passenger's position and having at least a pair of dependent steering systems, a pair of dependent braking systems, and a pair of independent accelerator systems, comprising:
    a first steering system for altering the vehicle's direction of movement, the first steering system having a first steering element inside the cab area and operable from the driver's position, a rotatable first post element having an upper end and a lower end, the lower end being at the floor of the cab and operatively engaged to at least one wheel, said first steering system including a first support means for supporting the first post element so as to be fixed in the cab to prevent tilting movement and thus maintain its position along only a single first axis, a first adaptor element operatively intermediate the first post element and the first steering element to transfer rotational movement between the first post element and the first steering element;
    a second steering system dependent upon the first steering system for altering the vehicle's direction of movement, the second system being operatively engaged, through the first steering system and having a second steering element located inside the cab area and operable from the passenger's position, the second steering system also including second support means to support the second steering element, the second support means being in one of a first position in the cab and a second position completely within and attached to a dashboard in the cab, the second support means remaining stationarily fixed upon rotation of either the first steering element or the second steering element, and a second adaptor element that transfers rotational movement between the second steering element and the first steering system;
    first means for connecting the first and second steering systems for tandem operation, including a first gear box and a second gear box associated with the first and second steering systems, respectively, the first means being located at one of the first position and a second position, the first position being at an exterior underside of said dashboard, the second position being within said dashboard, and a pair of universal joint elements that operatively engage the two gear boxes to each other;
    a first braking system operatively engaged to at least one wheel for retarding the vehicle's movement and having a first brake activation element disposed within the cab area and operable from the driver's position;
    a second braking system dependent upon the first braking system for retarding the vehicle's movement, the second system being operatively engaged, through the first braking system, to those wheels engaged by the first braking system and having a second brake activation element disposed within the cab area and operable from the passenger's position;
    second means for connecting the first and second braking systems for tandem operation, the second means being located at one of a first position and a second position, the first position being outside the cab, the second position being inside the cab;
    a first accelerator control system for controlling the speed of the vehicle and having a first accelerator activation element disposed within the cab area and operable from the driver's position; and
    a second accelerator control system operatively engaged to the engine for controlling the speed of the vehicle independent of the first accelerator control system and having a second accelerator activation element disposed within the cab area and operable from the passenger's position.

7. The driving system according to claim 6 wherein when the second support means is in the first position, the second support means includes a second post element in an open area of the cab with a lower end thereof adjacent the floor and an upper end thereof adjacent the second steering element.

8. The driving system according to claim 6 wherein when the second support means is in the second position, the support means includes a pair of side brackets with a rod element held therebetween and a plate element supported by the rod element and for holding the second gear box.

9. The driving system according to claim 6 wherein when the first connecting means is in the first position, the first connecting means includes a tie bar fixed to and between the first and second gear boxes, the first gear box being positioned at the upper end of the first post element, the second gear box being positioned at an upper end of a second post element extending underneath the dashboard and down to the floor of the cab.

10. The driving system according to claim 6 wherein when the first connecting means is in the second position, the first connecting means includes a steering shaft element fixed between the universal joints and inside the dashboard.

11. The driving system according to claim 6 wherein the second connecting means includes a brake shaft element operatively supported by a pair of bearing elements and operatively engaged to the first and second brake activation elements.

12. A dual control driving system for a truck having a non-tilting cab, comprising:
 a first steering system, including:
  a first steering element in the cab;
  a first adaptor element engaged to the first steering element;
  a first gear box located within and attached by a first plate to a dashboard in the cab, said first gear box being engaged to the first adaptor element; and
  a first post element that extends from a floor of said cab and to said dashboard for operative engagement to said first gear box such that said first post element can rotate while being prevented from tilting;
 a first brake activation element in the cab to activate a first braking system;
 a second brake activation element in the cab to activate a second braking system that is dependent upon the first braking system for operation;
 engaging means for operatively engaging the first braking system with the second braking system, including:
  a first bearing element stationarily fixed at the floor of and in the cab;
  a second bearing element stationarily fixed at the floor of and in the cab; and
  a rotatable member journalled in the bearing elements and engaged to the first and second brake activation elements; a second steering system, including:
 a second steering element in the cab;
 a second adaptor element engaged to the second steering element;
 a second gear box located within and attached to the dashboard, said second gear box being engaged to the second adaptor element; and
 a support means for supporting the second gear box, the support means including a second plate and bracket assembly stationarily fixed to and confined within the dashboard so as to preclude rotation of said support system and also obviate the need for another post element similar in function and configuration to said first post element;
 transferring means for transferring movement between the first and second gear boxes, the transferring means being within the dashboard; and
 a pair of acceleration systems.

* * * * *